United States Patent
Bow

(10) Patent No.: US 11,584,590 B2
(45) Date of Patent: Feb. 21, 2023

(54) TANK SLEEVE

(71) Applicant: D. Keith Bow, Corfu, NY (US)

(72) Inventor: D. Keith Bow, Corfu, NY (US)

(73) Assignee: Material Handling Innovators Co, Superior, CO (US)

( * ) Notice: Subject to any disclaimer, the term of this patent is extended or adjusted under 35 U.S.C. 154(b) by 71 days.

(21) Appl. No.: 17/014,735

(22) Filed: Sep. 8, 2020

(65) Prior Publication Data

US 2021/0070549 A1    Mar. 11, 2021

Related U.S. Application Data

(60) Provisional application No. 62/897,673, filed on Sep. 9, 2019.

(51) Int. Cl.
*B65G 7/12* (2006.01)

(52) U.S. Cl.
CPC ..................... *B65G 7/12* (2013.01)

(58) Field of Classification Search
CPC .......... B65G 7/12; B66F 9/187; F17C 13/084; F17C 2201/00; F17C 2205/00
USPC ...................................................... 294/119.2
See application file for complete search history.

(56) References Cited

U.S. PATENT DOCUMENTS

| | | | |
|---|---|---|---|
| 3,177,025 A | 4/1965 | Short | |
| 3,799,600 A * | 3/1974 | Chappell | A47G 23/0241 294/31.2 |
| 4,445,245 A | 5/1984 | Lu | |
| 4,460,010 A | 7/1984 | Paravigna et al. | |
| 4,753,474 A * | 6/1988 | Radford | F17C 13/084 294/160 |
| 4,795,202 A | 1/1989 | Mader | |
| 5,180,179 A | 1/1993 | Salvucci | |
| 5,730,479 A * | 3/1998 | Jansson | F17C 13/084 294/15 |
| 6,702,244 B2 | 3/2004 | Bock | |
| 7,588,276 B1 | 9/2009 | Bibow | |
| 2007/0090117 A1 | 4/2007 | Terry | |
| 2013/0099515 A1 | 4/2013 | Guerrero | |
| 2015/0034787 A1* | 2/2015 | Ramini | F17C 13/084 248/346.05 |

FOREIGN PATENT DOCUMENTS

| | | |
|---|---|---|
| EP | 3048358 | 7/2016 |
| FR | 2612467 | 9/1988 |

OTHER PUBLICATIONS

Polymer, "What is EVA Foam? How do You Choose Which Foam to Use?", Aug. 25, 2020 https://www.polymershapesfab.com/what-is-eva-foam-how-do-you-choose-which-foam-to-use/#:~:text=Ethylene%20vinyl%20acetate%2C%20or%20EVA,known%20as%20%E2%80%9Cfoam%20rubber.%E2%80%9D.*

(Continued)

*Primary Examiner* — Stephen A Vu
(74) *Attorney, Agent, or Firm* — Duane C. Basch; Basch & Nickerson LLP

(57) ABSTRACT

A continuous foam-type band suitable for placement about a cylindrical container such as a compressed air or gas cylinder is disclosed, and use of the band as a handle as well as a means for isolation and protection of the compressed air or gas cylinder or similar containers is also disclosed.

18 Claims, 6 Drawing Sheets

(56) References Cited

OTHER PUBLICATIONS

CylinderTank Carry Handle for Luxfer-StyleCompressed Gas Cylinders; https://picclick.com/Cylinder-Tank-Carry-Handle-fo-Luxfer-Style-Compressed-Gas; 1 page. Apr. 6, 2019.

Unique Truck Equipment, Inc., Safe Shop: Boa Grip Gas Cylinder Sling; https://www.uniquetruck.com/product/14579/safe-shop-boa-grip-gas-cylinder-sling?; 1page. Apr. 6, 2019.

Vestil Cylinder Handling Products, https://vestil.com/products/mhequip/manual_cylinder_lift; 4 pages. Apr. 6, 2019.

* cited by examiner

TANK SLEEVE

This application claims priority under 35 U.S.C. § 119(e) to U.S. Provisional Patent Application No. 62/897,673, for a TANK SLEVE, filed Sep. 9, 2019 by D. Keith Bow, which is hereby incorporated by reference in its entirety.

A tank sleeve securing and handling system is disclosed wherein one or more tank sleeves are adapted to be placed over and around a cylindrical container such as a compressed gas tank, whereby each sleeve is suitable for easily grasping the sleeve and the tank it is attached to in order to permit safe handling and transport of the tank.

BACKGROUND AND SUMMARY

As will be recognized by those familiar with the transport, storage and use of compressed air cylinders (e.g., welding gas tanks), such tanks present a potential problem when they are being moved and transported. When doing so, there is no convenient way to grasp the tanks to permit them to be easily moved, loaded, stored, etc. The disclosed tank sleeve(s) are believed to provide a novel solution to such a problem by not only providing a graspable sleeve that snugly fits over such tanks, but which further provides padding, graspable handles, etc. to permit the easy and safe movement, lifting, carrying and tying-down of such tanks.

Another advantage of the disclosed embodiments is that the tank sleeve protects the coating or finish of the tank or cylinder on which it is used. As will be appreciated, compressed gas cylinders are color coded to indicate the type of gas inside, and it is desirable to protect such color-coding in order to assure that there is no confusion as to the contents. By surrounding the tank and providing a buffer against other tanks or surfaces during use and transport, the disclosed tank sleeves preserve the tank surface coating and color, thereby extending the tank's useful life.

Disclosed in embodiments herein is a lifting handle(s) for a cylindrical gas container, comprising: a continuous (circular) rigid foam band or ring for placement about a cylindrical container, said band having at least one enlarged portion therein with an elongated aperture therethrough forming a handle in a size suitable for receiving the fingers and palm of a human hand for grasping of said foam band, and on a portion of the band opposite the elongated aperture at least a second enlarged portion with at least one generally flat or planar exterior surface suitable for stabilization of the cylindrical container when in a prone position; a generally circular opening in the interior of said band, the inner diameter of the opening having a diameter the same or smaller than the outer diameter of the cylindrical container; and said band being formed of a rigid ethylene vinyl acetate (EVA) type foam material and having a thickness (e.g., at least 1 inch, and in range of 1-3 inches) suitable for maintaining its general shape when the cylindrical container is lifted using the handle(s).

Also disclosed in embodiments herein is a pair of tank sleeves for application about an outer diameter of a compressed gas cylinder, each of the tank sleeves comprising: a continuous rigid foam band, said band having a first enlarged portion therein with an elongated aperture therethrough to form a handle, and on a portion of the band opposite the elongated aperture a second enlarged portion having at least one generally flat or planar exterior surface; and a generally circular opening in the interior of said band, the inner diameter of the opening having a diameter no greater than an outer diameter of the compressed gas cylinder.

Figure 1:
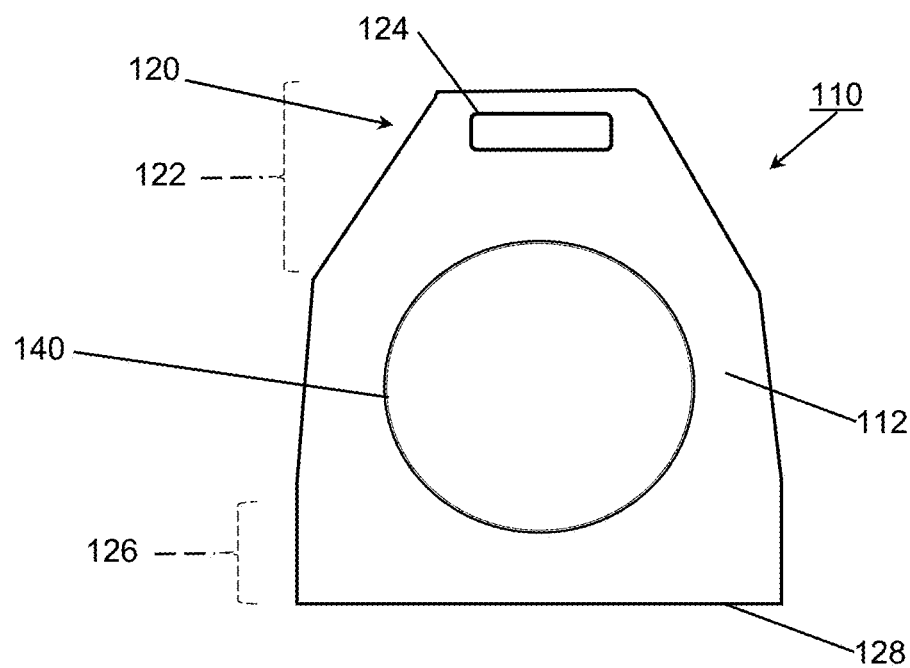
FIGS. 1-2 are front and side views of an exemplary tank sleeve in accordance with a disclosed embodiment.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

Figure 2:
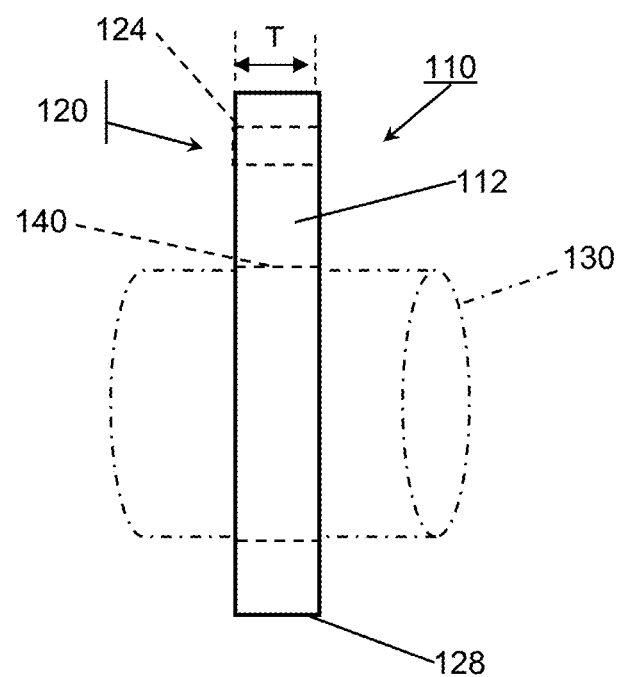

Referring to the figures, depicted therein are various embodiments and uses of a tank sleeve(s) 110 in the form of a foam-type band that is designed to be placed around a cylinder. In the disclosed embodiments the sleeve(s) 110 may be placed around a compressed gas cylinder, although other applications for use of the sleeve(s) are contemplated. For example, the disclosed sleeve(s) 110 include a band that extends around the outer surface or diameter of a cylinder, and as such is suitable for use as a handle as well as for isolation and protection of compressed air cylinders or similar containers. FIGS. 1 and 2 are directed to one embodiment of the tank sleeve(s) 110, in which bands 112 may be used as handle.

In particular, the respective front and side views of FIGS. 1 and 2 illustrate an embodiment in which the band 112 of tank sleeve 110 provide an aperture 124 suitable for use as a lifting handle 120. When the band is placed about the outer surface of a cylindrical object, such as a cylindrical gas container 130, the handle feature 120 may be used to grasp the band and lift or maneuver the container 130. The depicted embodiment includes a continuous rigid foam band or ring 112 that fully encircles a cylindrical container 130 about which the band 112 has been removably attached by sliding the band over the outer surface of the container 130.

Band 112 has at least one enlarged portion 122 therein with an elongated aperture 124 therethrough forming the handle 120 in a size suitable for receiving the fingers and palm of a human hand. Handle 120 facilitates grasping of the foam band so as to be able to maneuver or lift the entire tank sleeve 110 as well as a cylindrical container or similar object that the band surrounds. In addition, on another portion of the band, which may be opposite the elongated aperture, at least a second enlarged portion 126 is provided and has at least one generally flat or planar exterior surface 128 suitable for stabilization of the cylindrical container when the tank is placed in a horizontal or prone position.

Band 112 also has a generally circular opening 140 in the interior of the band, and the inner diameter of the opening 140 has a diameter the same or slightly smaller than the outer diameter of the cylindrical container so as to provide a frictional coupling when the aperture 140 is slidably placed over a cylindrical object such as gas container or tank 130. Gas container or tank 130 may include various types having different outside diameters for which aperture 140 may be sized. For example, tanks for industrial gases typically have an outside diameter (O.D.) of about 7-10 inches, medical oxygen tanks have an O.D. of $9^{13}/_{64}$ inches, but compressed gas tanks can have diameters ranging from 2-30 inches. Depending upon the material employed for forming the tank sleeve, one sleeve may be used for a range of tank O.D.'s. Alternatively, the aperture 140 may be non-circular (e.g., including tabs, ridges or similar features) to facilitate use over a range of tank diameters, yet assuring frictional contact between the tank sleeve, at least in part along the walls of aperture 140, and the tank 130. While the band may be formed of various materials or combinations thereof, in one embodiment the band is formed entirely of a closed-cell conformable or compliant foam material, such as a rigid ethylene vinyl acetate (EVA) type foam material. Similarly, although depicted in the side view of FIG. 2 as having a thickness (T), the thickness is at least 1 inch, and in range of 1-3 inches, so as to be adequate for maintaining its general shape when a cylindrical container is lifted using the handle(s).

It is also possible that the stress points and or contact surfaces of the sleeve may be coated or laminated with a high-friction and/or compliant material. For example, the inner surface of aperture 140 and the bottom surface 128 may be formed of, coated, or laminated with, an alternative material so that the sleeve comprises multiple materials. For example, the tank sleeve may also be formed using a more rigid outer member and an inner member or lining made of a conformable material (above and below). Examples of materials to be used as the outer member include rigid plastics or polymers such as glass-filled nylons, light-weight metals such as aluminum. And, it remains possible to make the entire sleeve from a single material such as the EVA foam so as to reduce the cost and complexity of manufacture. Various conformable materials are contemplated for use in forming all or a part of the tank sleeve, and such materials include not only closed-cell foams but other compliant and conformable foams, polymers, rubberized materials including synthetic and natural rubber, composites and combinations thereof. Such materials may be selectively employed based upon properties such as compliance, conformance, vibration dampening, stiffness, surface friction, porosity, durability, etc.

Figure 3:
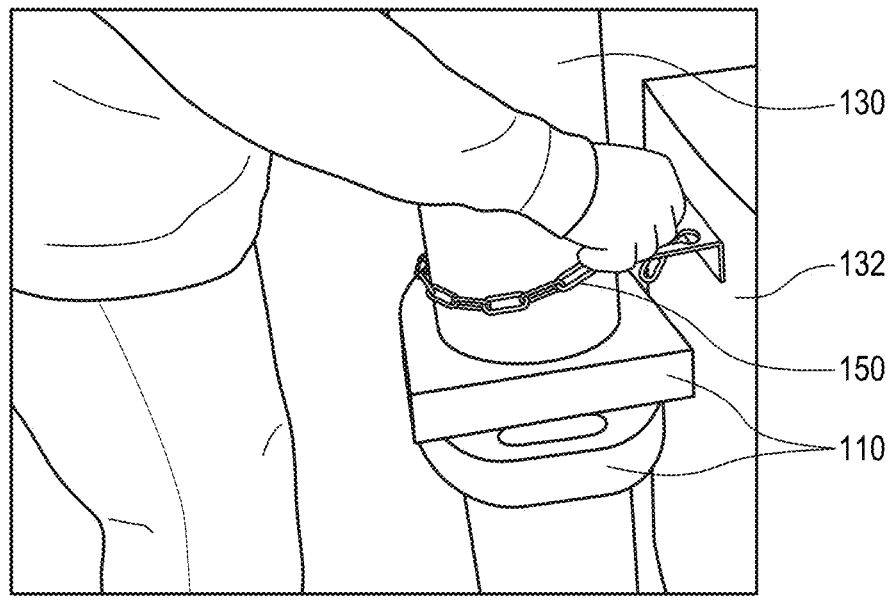
FIGS. 3-7 depict a representative sequence of illustrations of the various uses of an embodiment of the tank sleeve.

Turning next to FIGS. 3-7, a series of illustrations are provided to show exemplary uses of tank sleeves 110. In FIG. 3, the sleeves are shown in use as spacers or buffers for tank 130 to protect it from adjacent structure 132 such as a welder, wall, other tanks, etc. The use of a chain 150 to hold the tank upright does not provide adequate separation from adjacent structures like the sleeves 110 do.

Figure 4:
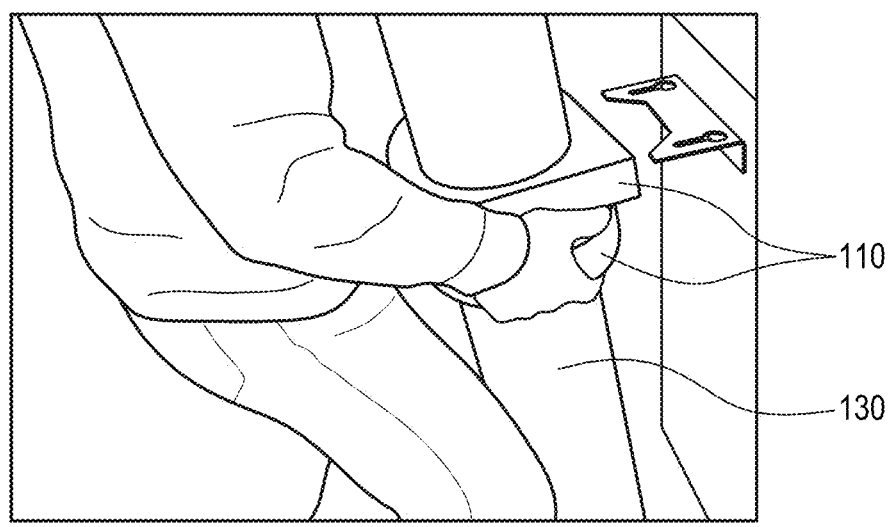
Figure 5:
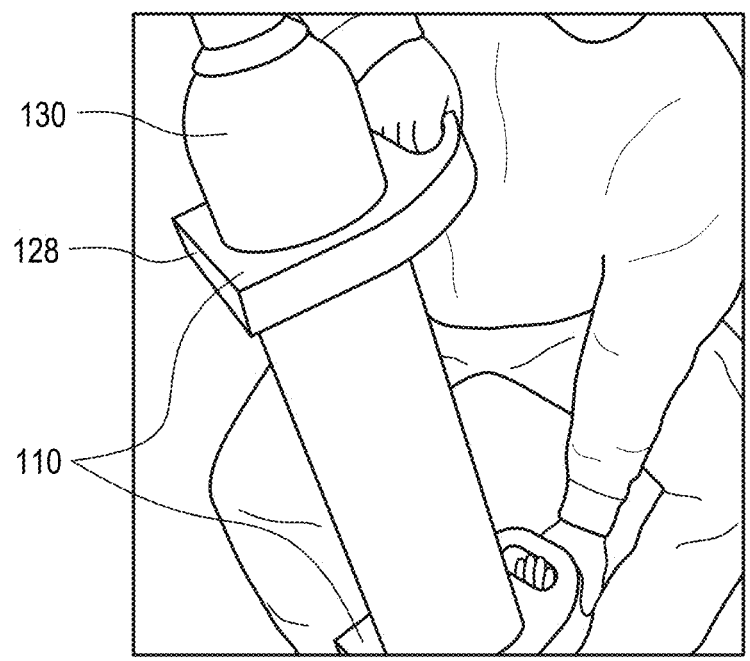
Figure 6:
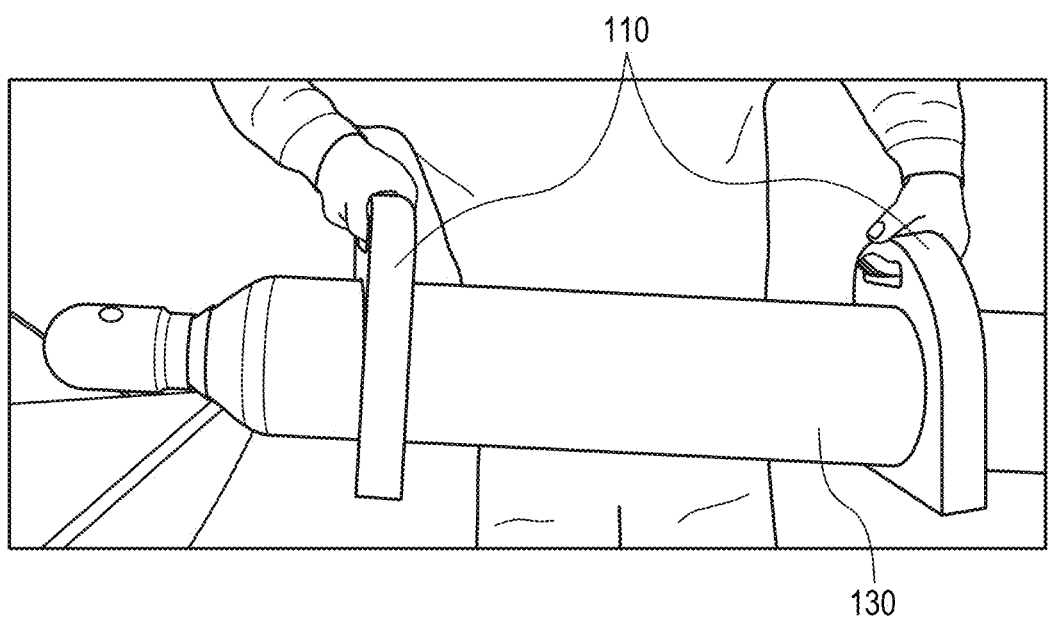

FIGS. 4-5 illustrate the manner in which the sleeves 110 can be applied about the outside of the tank and then employed to grasp the tank 130 and to lift and maneuver the tank. In particular, when placed adjacent one another as shown in FIG. 4, with the handles positioned on opposite side of the tank, the sleeves serve to enable lifting of the cylinder in a generally vertical orientation. Repositioning of the sleeves 110 as illustrated, for example, in FIGS. 5-6, result in the sleeves handles being generally aligned along the outside of the tank, yet spaced approximately shoulder-width apart allowing them to be easily grasped as depicted in FIG. 6 for carrying the tank in a horizontal position. As is clear from the various illustrations in FIGS. 3-7, the sleeves 110 may be repositioned as necessary by sliding along a longitudinal axis of the tank 130 and/or by twisting or spinning them relative to the tank (e.g., about the longitudinal axis of the tank). In this manner, various configurations of the sleeves, and the associated handles therein, may be used in order to lift and carry the tank and thereby permit its easy movement. Furthermore, while not designed as safety mechanisms, the further advantage of the disclosed tank sleeves is that in the event the tank is dropped or bumped, the sleeves provide further protection from damage of the tank.

Figure 7:
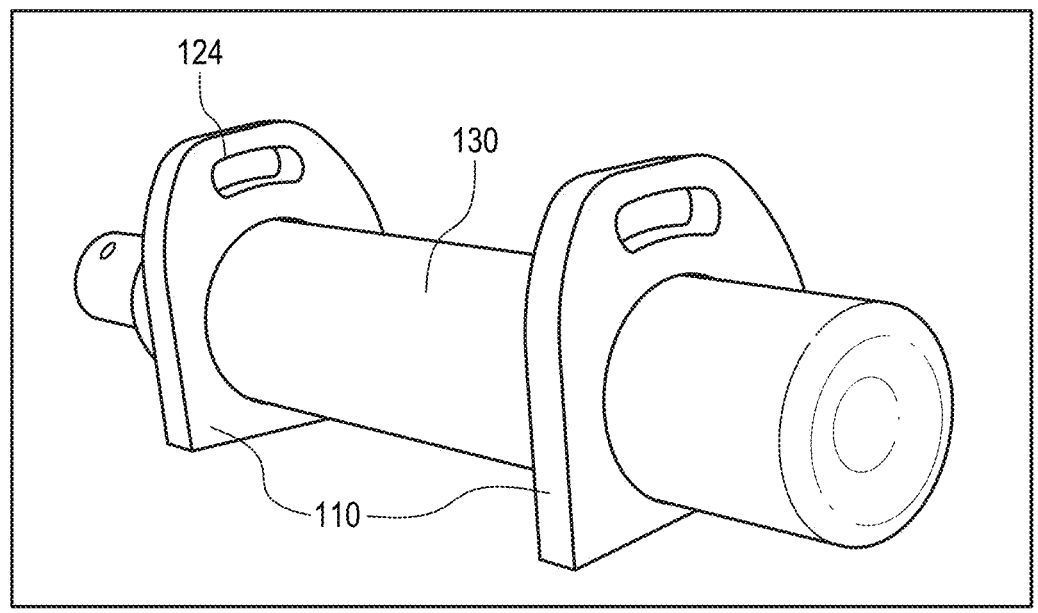

As will be appreciated by a review of the illustration in FIG. 7, the sleeves also provide for, via flat lower surface 128, the stable storage of the cylinder during horizontal tank transport. In the design of FIGS. 1 and 2, the center of mass of the sleeves combined with the tank is centered in the sleeves to prevent the cylindrical tank from rolling, indeed from even tipping when stored in a horizontal position on a truck bed, as depicted in FIG. 7. Alternatively, the tank with the sleeves applied may similarly be chained or strapped in a vertical position against a wall or similar structure, the sleeves not only provide a cushion against contact with the tank, but a stable support as well.

Figure 8:
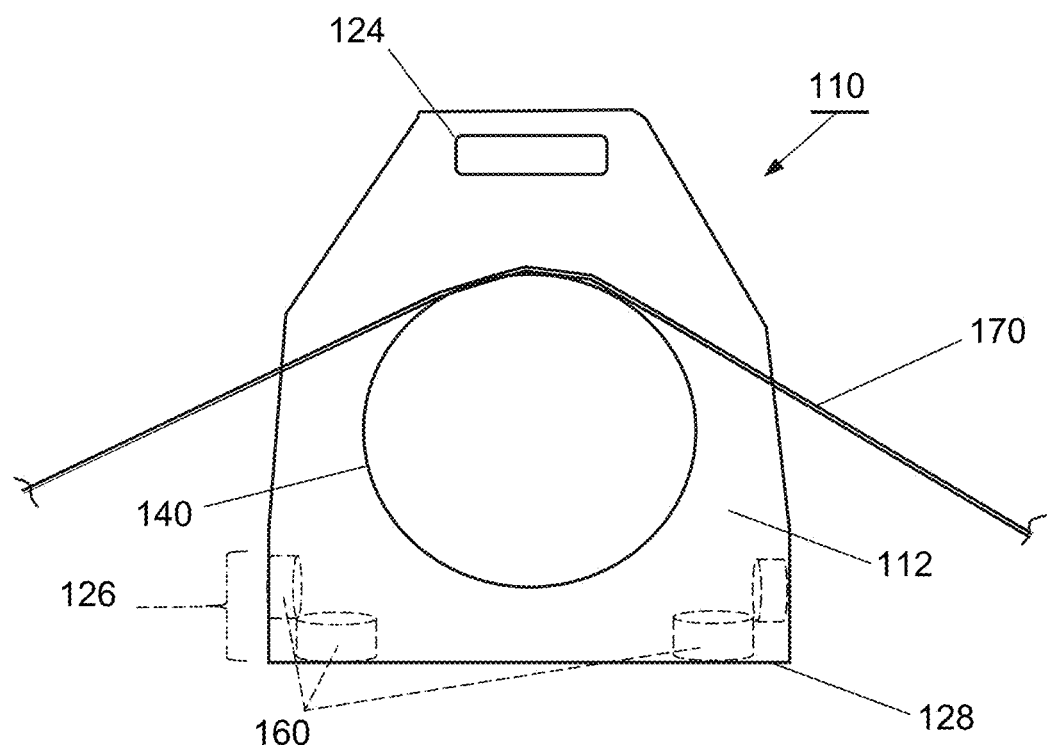
FIG. 8 is a front view of an alternative embodiment of a tank sleeve.

Turning to FIG. 8, depicted therein is an alternative embodiment where the tank sleeve 110 of FIG. 1 is further modified to include magnets 160 or similar attachment mechanisms (e.g., hook-loop type fasteners) to help stabilize or hold the sleeve 110 and associated tank 130 during transport and/or use. It will be appreciated that magnets 160, may be permanent or switchable magnets so that the magnetic force is always available or only available when the magnets are switched "on". And, it should be further appreciated that the magnets 160, depending upon their strength may be affixed on or within the sleeve 110 so as to be co-planar with lower surface 128, or they may be slightly recessed from the lower surface to force the lower surface into compliant contact when a ferro-magnetic surface is adjacent the bottom surface 128 and magnets 160.

Figure 11:
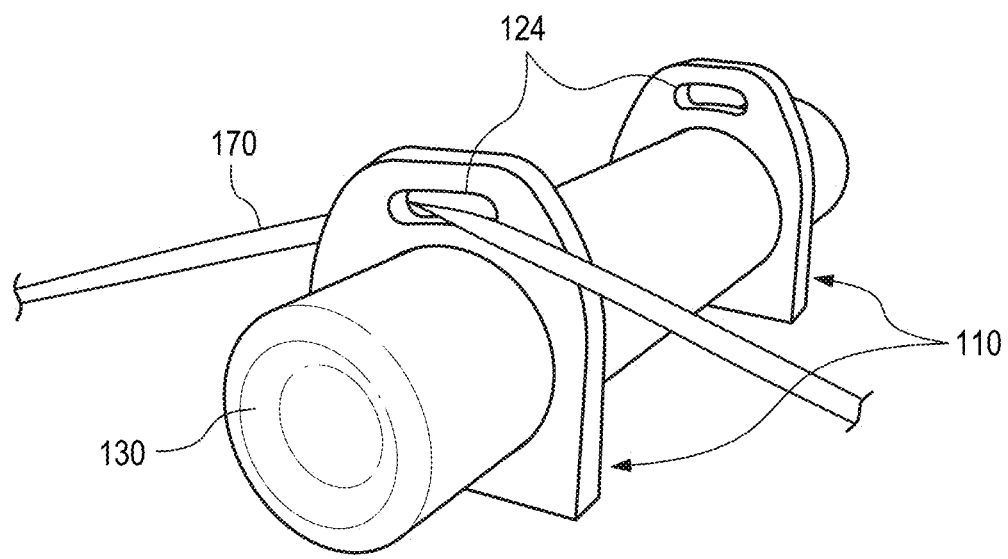
FIG. 11 is an illustration of an alternative method of tie-down using the tank sleeve.

Also illustrated in FIG. 8 is an optional strap-type fastener 170 that is suitable for releasably attaching the tank to the bed of a truck or other transport vehicle. In an alternative configuration, for example as illustrated in FIG. 11, tank 130 may be transported in the bed of a truck using a pair of sleeves 110, and attached to the truck using strap 170 that is passed through the elongated aperture 124. Such a tie-down method applies the force of the strap through the sleeve to hold the tank in place for transport.

Figure 9:
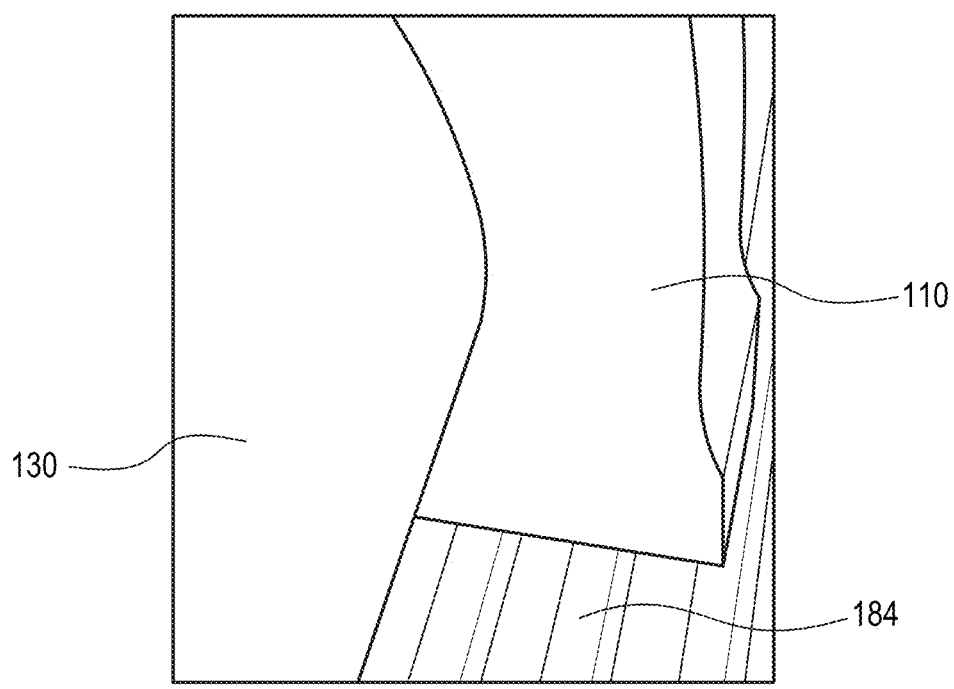
FIG. 9 is a view of a tank sleeve in use for horizontal transport of a tank, showing the manner in which a lower surface of the tank sleeve at least partially conforms to an irregular support surface.

Referring to FIG. 9, the figure illustrates the manner in which the lower surface 128 of the sleeves 110 at least partially conforms to an irregular surface 184 upon which the sleeves rest. As will be appreciated, the various advantages of the tank sleeves as disclosed herein include an anti-roll feature whereby the sleeves, when attached to a tank that is stored horizontally on a surface or platform for transport, resist rolling of the tank. The sleeves also work in a similar fashion for a vertically stored tank(s), stabilizing a tank to prevent unwanted rotation when stored or mounted (e.g., chained or strapped) against a flat wall surface. The foam material from which the sleeves may be made further provides a shock-absorbing feature to cushion against accidental fall or tip over of a cylinder during use or transport. And, as will be further appreciated the sleeves also provide protection from scuffing when positioned next to other tanks during transport or storage.

Figure 10:
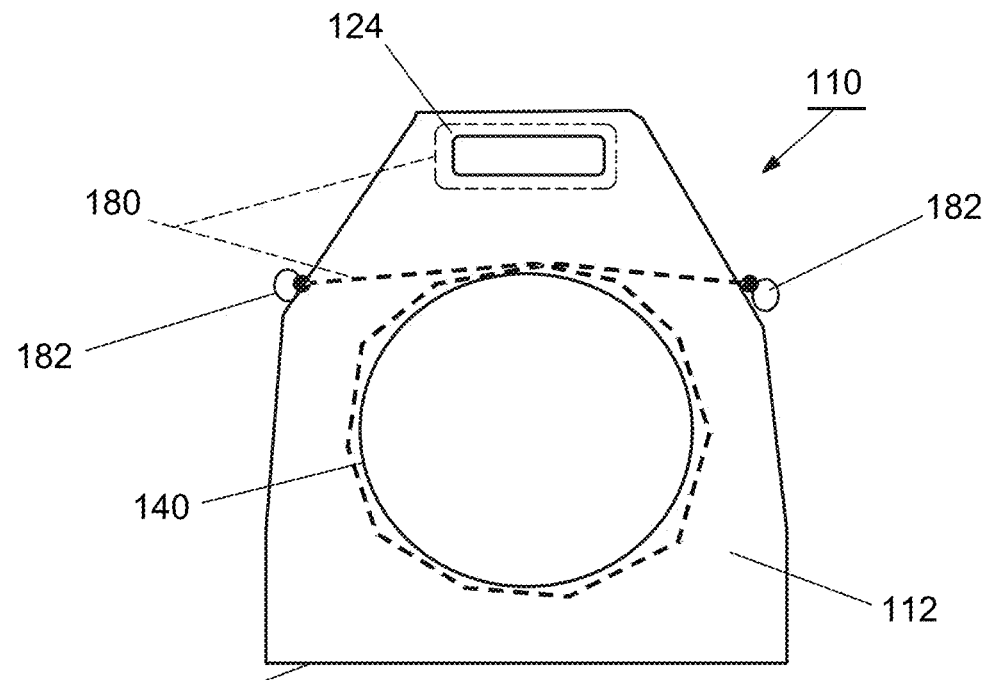
FIG. 10 depicts a front view of an alternative embodiment of the tank sleeve.

In yet a further alternative embodiment as depicted for example in FIG. 10, the tank sleeve may further include a built in (e.g., molded in) spring wire 180 that will encircle the outer diameter of the tank, but will only be exposed where b-rings or similar attachment members 182 (e.g., rings, hooks, clips and the like) are placed for tie-down and securement of the tank. In such an embodiment when the D-rings are used for tie-down and pulled on by straps (not shown), the spring wire effectively clamps down on the tank cylinder. There may also be a molded in wire that encircles the upper handle aperture and reinforces the handle 124 and/or connects to the spring wire 180 (all inside of the molded tank sleeve) in case the handle is cut or damaged in some fashion. The addition of the wires 180 reinforces the tank sleeve so that if someone damages the foam body, there is a backup system to prevent the tank from moving or falling.

As will be appreciated, the disclosed tank sleeves facilitate lifting and movement of the tank and allow a person(s) to carry it horizontally and vertically. The tank sleeves permit someone to load and unload compressed gas tanks from a truck, also to load and unload a welding cart. The multi-functional features of the tank sleeve include lifting, vertical and horizontal, storage and securement, cushioned tip-over protection, scuff protection, transport and tie down rings.

In yet another alternative embodiment, the tank sleeve system may include a gang system that was magnetically attached to a carrier or other vehicle, such as a truck, where tanks or bottles slide into the apertures of adjacent tank sleeves and are held in place with built in tie downs. Contemplated in such a configuration is where adjacent tank sleeves are magnetically adjoined to one another by magnets 160 placed along or adjacent abutting lower portions 126.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. An apparatus for maneuvering a cylindrical container of a given outer diameter, comprising:
    a continuous rigid foam band for placement about the cylindrical container, said band having at least one enlarged portion therein with an elongated aperture therethrough forming a handle, and on a portion of the band opposite the elongated aperture at least a second enlarged portion with at least one generally flat exterior surface;
    a generally circular opening in the interior of said band, the opening having a diameter no greater than the given outer diameter of the cylindrical container, said band configured to be slidably placed about the cylindrical container and thereby engage the cylindrical container within the opening, permitting the cylindrical container to be maneuvered using the handle; and
    said band being at least partially formed of a conformable material and having a thickness suitable for maintaining its general shape when the apparatus is used for maneuvering the container therein.

2. The apparatus according to claim 1, where the conformable material includes a closed-cell foam.

3. The apparatus according to claim 2, where the closed cell foam includes a rigid ethylene vinyl acetate material.

4. The apparatus according to claim 1, further including at least one magnet located adjacent an exterior side of the second enlarged portion of the band.

5. The apparatus according to claim 1, where the opening in the foam band of each tank sleeve includes features to facilitate use of the apparatus over a range of tank diameters while assuring frictional contact between the tank and the interior of the opening.

6. A pair of tank sleeves for application about an outer diameter of a compressed gas cylinder in order to protect and maneuver the compressed gas cylinder, each of the tank sleeves comprising:
    a continuous rigid foam band, said band having a first enlarged portion therein with an elongated aperture therethrough to form a handle, and on a portion of the band opposite the elongated aperture a second enlarged portion having at least one generally flat or planar exterior surface; and
    a generally circular opening in the interior of said band, the opening having a diameter no greater than an outer diameter of the compressed gas cylinder, said band configured to slidably fit about the compressed gas cylinder and thereby engage the compressed gas cylinder within the opening, enabling the handle to maneuver the compressed gas cylinder.

7. The tank sleeves according to claim 6, where said foam band is at least partially formed of a conformable material.

8. The tank sleeves according to claim 6, where said foam band has a thickness between about 1 inch and 3 inches.

9. The tank sleeves according to claim 6 wherein said foam band has a thickness suitable for maintaining its shape when the cylindrical container is lifted using the handle.

10. The tank sleeves according to claim 6, where the foam band includes a conformable material.

11. The tank sleeves according to claim 10, where that the conformable material includes a closed-cell foam.

12. The tank sleeves according to claim 11, where the closed cell foam includes a rigid ethylene vinyl acetate material.

13. The tank sleeves according to claim 10, further including at least one spring wire in the band.

14. The tank sleeves according to claim 6, further including at least one magnet located adjacent an exterior side of the second enlarged portion of the band.

15. The tank sleeves according to claim 6, further including at least one attachment member.

16. The tank sleeves according to claim 6, where the opening in the foam band includes features to facilitate use of the apparatus over a range of tank diameters while assuring frictional contact between the tank and the interior of the opening.

17. A cylindrical tank maneuvering and storage apparatus, comprising:
    a continuous rigid foam band for placement about the cylindrical tank, the cylindrical tank having a given outer diameter, said band having at least one enlarged portion therein with an elongated aperture therethrough forming a handle, and on an outer portion of the band opposite the elongated aperture at least a second enlarged portion with a flat exterior surface;

an opening in the interior of said band, the opening being of a configuration to conform and provide a frictional coupling with an outer surface of the cylindrical tank when the band is slidably placed over and about the cylindrical tank; and said band being at least partially formed of a conformable material and having a thickness suitable for maintaining its general shape when placed over and about the cylindrical tank for maneuvering and storing the cylindrical tank.

18. The apparatus according to claim 17, where the opening is non-circular and further includes features assuring frictional contact with an outer surface of the tank.

* * * * *